United States Patent
Agrawal et al.

(10) Patent No.: US 11,455,142 B2
(45) Date of Patent: Sep. 27, 2022

(54) ULTRA-LOW PRECISION FLOATING-POINT FUSED MULTIPLY-ACCUMULATE UNIT

(71) Applicant: INTERNATIONAL BUSINESS MACHINES CORPORATION, Armonk, NY (US)

(72) Inventors: Ankur Agrawal, Chappaqua, NY (US); Silvia Mueller, Altdorf (DE); Kailash Gopalakrishnan, New York, NY (US); Bruce Fleischer, Bedford Hills, NY (US); Balaram Sinharoy, Poughkeepsie, NY (US); Mingu Kang, Old Tappan, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 16/432,358

(22) Filed: Jun. 5, 2019

(65) Prior Publication Data

US 2020/0387351 A1 Dec. 10, 2020

(51) Int. Cl.
*G06F 7/544* (2006.01)
(52) U.S. Cl.
CPC ................... *G06F 7/5443* (2013.01)
(58) Field of Classification Search
CPC ........ G06F 7/5443; G06F 7/57; G06F 9/3001; G06F 9/30036
See application file for complete search history.

(56) References Cited

U.S. PATENT DOCUMENTS

| 5,862,067 | A | 1/1999 | Mennemeier et al. |
| 6,523,055 | B1* | 2/2003 | Yu .......................... G06F 7/5443 708/603 |
| 8,626,813 | B1* | 1/2014 | Swartzlander ........ G06F 7/5443 708/501 |
| 10,140,092 | B2 | 11/2018 | Ahmed |
| 2010/0121898 | A1* | 5/2010 | Swartzlander, Jr. .. G06F 17/142 708/501 |

(Continued)

OTHER PUBLICATIONS

"Efficient Fixed/Floating-Point Merged Mixed-Precision Multiply-Accumulate Unit for Deep Learning Processors" Zhang et al. Departmant of Electrical and Computer Engineering, University of Saskatchewan, Canada Departmant of Electrical and Computer Engineering, Seoul National University, Korea 2018 (5 Pages).

*Primary Examiner* — Matthew D Sandifer
*Assistant Examiner* — Huy Duong
(74) *Attorney, Agent, or Firm* — Griffiths & Seaton PLLC

(57) ABSTRACT

Embodiments for implementing a fused multiply-multiply-accumulate ("FMMA") unit by one or more processors in a computing system. Mantissas for two products, an exponent difference of the two products serving as an alignment shift amount for a product of the two products having a smallest exponent, and an alignment shift amount for an addend relative to an alternative product of the two product having a larger exponent may be determined in parallel. The addend may be aligned relative to the alternative product having the larger exponent. The product having the smallest exponent may be aligned relative to the alternative product having the larger exponent according to the alignment shift amount.

20 Claims, 9 Drawing Sheets

(56) References Cited

U.S. PATENT DOCUMENTS

| | | | |
|---|---|---|---|
| 2014/0052968 A1* | 2/2014 | Corbal | G06F 9/30018 |
| | | | 712/222 |
| 2014/0067895 A1* | 3/2014 | Wang | G06F 7/483 |
| | | | 708/501 |
| 2014/0188966 A1* | 7/2014 | Galal | G06F 7/5443 |
| | | | 708/501 |
| 2017/0220319 A1* | 8/2017 | Klein | G06F 5/012 |
| 2017/0293470 A1* | 10/2017 | Wang | G06F 7/5443 |
| 2018/0308207 A1 | 10/2018 | Appu et al. | |
| 2018/0321938 A1 | 11/2018 | Boswell et al. | |
| 2019/0042242 A1 | 2/2019 | Das et al. | |

\* cited by examiner

ULTRA-LOW PRECISION FLOATING-POINT FUSED MULTIPLY-ACCUMULATE UNIT

BACKGROUND OF THE INVENTION

Field of the Invention

The present invention relates in general to computing systems, and more particularly to, various embodiments for implementing an ultra-low precision floating-point fused multiply-multiply-accumulate ("FMMA") unit in a computing system using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research such as, for example, in deep learning ("DL") is to improve the training speed of a machine learning system.

SUMMARY OF THE INVENTION

Various embodiments for implementing an (ultra-low precision floating-point) fused multiply-multiply-accumulate ("EMMA") unit by one or more processors in a computing system, are provided. In one embodiment, by way of example only, a method for implementing a fused multiply-multiply-accumulate ("EMMA") unit in a computing system, again by a processor, is provided. In this embodiment, the computed result is the sum of an addend and two products. Mantissas for two products, an exponent difference of the two products serving as an alignment shift amount for one of the two products having a smallest exponent, and an alignment shift amount for an addend relative to the other one of the two product having a larger exponent may be determined in parallel. The addend may be aligned relative to the alternative product having the larger exponent. The product having the smallest exponent may be aligned relative to the alternative product having the larger exponent according to the alignment shift amount.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
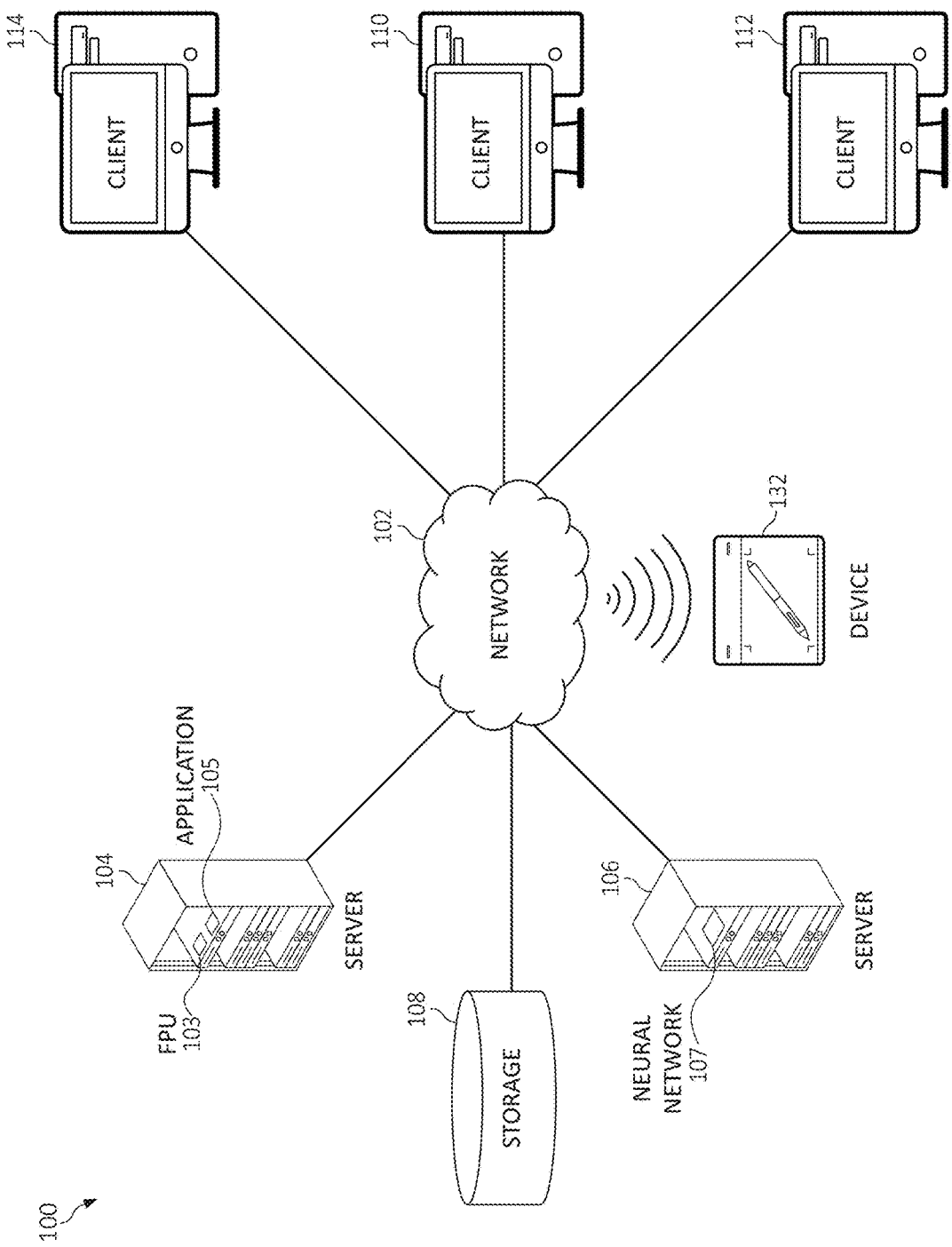
FIG. 1 is a block diagram of a network of data processing systems according to an embodiment of the present invention.

The present invention relates generally to the field of deep learning ("DL"), and more specifically to implementing ultra-low precision floating-point fused multiply-accumulate unit in deep-learning implementations. Since computer memory is limited, it is not possible to store numbers with infinite precision, no matter whether the numbers use binary fractions or decimal fractions. At some point a number has to be cut off or rounded off to be represented in a computer memory.

How a number is represented in memory is dependent upon how much accuracy is desired from the representation. Generally, a fixed-point representation of numbers with binary bits is unsuitable for the varied applications where those numbers are used. To satisfy different types of applications and their respective needs for accuracy, a general-purpose number format has to be designed so that the format can provide accuracy for numbers at very different magnitudes. However, only relative accuracy is needed. For this reason, a fixed-point representation is not very useful. Floating point representation solves this problem.

A floating point representation resolves a given number into three main parts—(i) a significand that contains the number's digits, (ii) an exponent that sets the location where the decimal (or binary) point is placed relative to the beginning of the significand. Negative exponents represent numbers that are very small (i.e., close to zero), and (iii) a sign (positive or negative) associated with the number.

A floating point unit (FPU) is a processor or part of a processor, implemented as a hardware circuit, that performs floating point calculations. While early FPUs were stand-alone processors, most are now integrated inside a computer's CPU. Integrated FPUs in modern CPUs are very complex, since they perform high-precision floating point computations while ensuring compliance with the rules governing these computations, as set forth in IEEE floating point standards (IEEE 754).

An FPU has a bit-width. The bit-width is a size, in terms of a number of binary bits used to represent a number in a floating point format (referred to hereinafter as a "format" or "floating point format"). One or more organizations, such as Institute of Electrical and Electronics Engineers (IEEE), have created standards pertaining to floating point formats. The presently used formats provide standard method of representing numbers using 16-bit, 32-bit, 64-bit, and 128-bit formats.

For example, a floating point format may include a sign, an unsigned biased exponent, and a significand. The sign bit is a single bit and is represented by an "S". The unsigned biased exponent, represented by an "e," is (in the formats defined by IEEE 754, for example) 8 bits long for single precision, 11 bits long for double precision and 15 bits long for quadruple precision. The significand is, again, in the IEEE 754 standard, 24 bits long for single precision, 53 bits long for double precision and 113 bits long for quadruple precision. As defined by the IEEE-754-2008 standard, the most significant bit of the significand, i.e., the so called implicit bit, is decoded out of the exponent bits.

Moreover, to improve floating-point arithmetic processing, most modern processors have an operation called the fused-multiply-add ("FMA") operation which combines a floating point multiplication operation, e.g., A*B, and a floating point addition operation, e.g., +C, for execution as a single instruction, e.g., A*B+C, where A, B, and C are operands of the multiplication product of A*B and the sum of C and the product. By performing two operations in a single instruction, the FMA operation reduces overall execution time. The FMA operation also provides improved accuracy because rounding need only be performed after both the multiplication and addition operations are performed at full precision (e.g., there is only one rounding error instead of two).

Currently, multiply-add floating-point units perform the FMA operation using the following equation:

$$R=C+A*B \qquad (1),$$

where A, B, and C are operands of the multiplication product of A*B and the sum of C and the product and all operands and the result have the same precision, for example, double precision (64b or fp64), single precision (32b or "fp32") and recently also half precision (16b or "fp16") and R may be equal to equation 1A:

$$R=\text{round}(C+A*B) \qquad (1A).$$

Before the addition operation, the product and addend must be aligned, requiring that at least one of the product and addend must be shifted. In double, single, and half precision FMA units, computing the product even in redundant form takes as longs as aligning the addend, which is the reason conventional FMA units align the addend relative to the product, and do not shift the product.

It should be noted that, as used herein, a mixed-precision fused-multiply-multiply-accumulate (FMMA) operation is where one or more of its inputs and/or outputs in one precision (for example, fp16) and others in a different precision (for example, fp8). A hybrid fused multiply-multiply-accumulate allows its VLP (for example, fp8) operands to have 2 different formats, for example, 1/5/2 (e.g., sign+5 exponent bits+2 mantissa bits) and 1/6/1 (e.g., sign+6 exponent bits+1 mantissa bit). A merged floating point unit can be configured to either perform one regular fp16 fused-multiply-add (FMA) or one mixed-precision FMMA operation.

A Fused-multiply-add (FMA) operation takes 3 operands (A, B, and C) and produces (C+A*B) as the result. The FMA combines an addition and a multiplication operation into a single instruction. A fused multiply-multiply-accumulate (FMMA) instruction takes 5 operands (A1, B1, A2, B2, C) and produces (C+A1*B1+A2*B2) as the result. The FMMA combines 2 multiplications and 2 additions within a single instruction. It should be noted that "A" in FMA may be "add" operation, while the "A" in FMMA may be "accumulate" operation (e.g., adding more than two items together).

At this point it should be noted that deep learning neural networks, also referred to as Deep Neural Networks (DNN) are a type of neural networks. The configuring and training of DNNs is computation intensive. Over the course of the training of a DNN, many floating point computations have to be performed at each iteration, or cycle, of training. A DNN can include thousands if not millions of nodes. The training of large DNN requires many trillions of floating point computations. Furthermore, different floating point computations in the DNN training may potentially have to be precise to different numbers of decimal places.

Machine learning workloads tend to be computationally demanding. Training algorithms for popular deep learning benchmarks take weeks to converge on systems comprised of multiple processors. Specialized accelerators that can provide high throughput for floating point computations, relative to both area (computation throughput per square millimeter of processor space) and power (computation throughput per watt of electrical power consumed), are critical for future deep learning systems.

Approximate computing techniques trade off the inherent resilience of machine learning operations for improved computational efficiency. To this end, a need exists for exploiting reduced numerical precision for data representation and computation since hardware energy efficiency improves quadratically with bit-precision such as, for example, exploiting reduced numerical precision for DNN training and inference. Although it is well-known to those skilled in the art that 8-bit floating point formats have been successfully used for DNN training, a need exists for hardware systems that can exploit ultra-low precision floating-point format with fewer than 16 bits to deliver throughout and power efficiency gains.

Thus, the present invention provides for providing high throughput for floating point computations by performing arithmetic in low or even ultra-low precision using a format with fewer than 16 bits (ultra-low precision, very low precision formats "VLP" format, VLP formats, etc.). In this way, the present invention performs computations in reduced precision by 1) enabling a more power-efficient hardware system (e.g., in a DNN), since energy efficiency improves quadratically as bit-precision reduces, and 2) achieves at least two times throughput over an fp16 FMA and does not incur a cycle-time (e.g., logic depth) penalty. For example, the detailed description below applies to an 8-bit floating point format ("fp8") but the present invention applies to VLP floating point units and hybrid VLP/fp16 units in general and is not limited to VLP formats with 8 bits. While weights and activations are in fp8, the products of weights and activations get accumulated in 16-bit floating-point ("fp16" or half-precision) with a mixed-precision FMMA operation. The mixed-precision FMMA (e.g., mixed-precision fp8/fp16) instruction (e.g., a combination of fp8 and fp16 or fp8/fp16) simplifies the DL training in this ultra-low precision space.

In one aspect, the basic floating point function is a fused-multiply-multiply-accumulate ("FMMA"), according to the equation:

$$R = C + A1*B1 + A2*B2, \qquad (2)$$

where R, C are in fp16, and the product terms A1, A2, B1, B2 are in fp8 (e.g., the 16-bit input for A and B is as a two-element pair, with 8 bits per element), 16-bit input for A and B may be a two-element pair with 8 bits per element, and R may be equal to equation 2A:

$$R = \mathrm{round}(\mathrm{align}(C) + \mathrm{align}(A1*B1 + A2*B2))). \qquad (2A)$$

Any reference to "very low precision" format is a reference to a floating point format that uses less than 16 bits. Only as a non-limiting example, the illustrative embodiments described herein use an 8-bit floating point format for the clarity of the description. As used herein, those of ordinary skill in the art will be able to adapt an embodiment to many other floating point formats, such as using a number of bits ranging from 9 bits to 16 bits, or even using a number of bits less than 8 bits for some applications, and the same are contemplated within the scope of the illustrative embodiments.

Thus, the present invention requires a new type of floating-point unit capable of achieving at least two times throughput performance while limiting any additional amount of computing hardware (see FIGS. 5 and 7) by introducing a special internal rounding operation, since now three terms need to be aligned to one another and not just one product and one addend as in conventional floating-point multiply-add units. Thus, the internal rounding operation provided by the present invention enables reduced computing hardware implementation while preserving DNN convergence.

Accordingly, to implement the FMMA function of R=C+A1*B1+A2*B2, equation (2) may be divided into two FMA operations:

$$R1 = C + A1*B1 \qquad (3)$$

$$R = R1 + A2*B2. \qquad (4)$$

However, this will increase the latency of the operation and either double the hardware cost or reduce the throughput by at least two times if performed one right after another rather than in parallel/together at the same time. Thus, the present invention provides a computing system that enables the two instructions (e.g., equation 3 and 4) to achieve at least two times the throughput in fp8 and fp16 mode over a single fp16 mode by being performed in parallel and/or together at the same time.

In one aspect, operands in the fp8 format may have a 1-bit sign, 5-bit exponent, 2-bit fraction, and 3-bit mantissa (fraction+implied bit). In a hybrid-precision FMMA operation, the VLP operands can also have 1-bit sign, 6-bit exponent and a 1-bit fraction. Thus, the ultra-low precision products have at most a 6-bit mantissa computed by a 3×3 bit multiplier where the multiplier is extremely fast. In a mixed-precision or hybrid-precision FMMA, (e.g., fp8 fp16) operation for equation (2) (e.g., R=C+A1*B1+A2*B2) the products can be computed faster than the alignment shift amounts. In this way, the present invention provides for the novel computation steps as follows.

In step 1, the present invention may compute in parallel a) the product mantissas (e.g., "pm1" and "pm2") for the two products, b) the exponent difference of the two products, which serves as alignment shift amount for the product with the smaller exponent, and c) alignment shift amount for addend relative to product with larger exponent.

In step 2, the addend may be aligned relative to the product with larger exponent. The product with a smaller exponent relative to the product one with larger exponent may also be aligned. After alignment, the addend and two mantissas all have a common exponent, epb (e.g., the larger product exponent). In step 3) depending on the sign of the addend and products, add or subtract the aligned mantissas (e.g., fractions). In step 4) the intermediate sum/difference may be normalized and rounded to a target precision.

In this way, steps 1 and 2 provide enhancements over the current state of the art where the two products and the addend are aligned to the product with the larger exponent. This allows a processor to perform the two FMA operations (e.g., equation (3) and equation (4)) together/in parallel rather than performing one equation after the other, thereby reducing latency of the operation without doubling the hardware cost or reducing the throughput by at least two times. Thus, the mixed fp8/fp16 multiply-accumulate operation of equation (2) (e.g., R=C+A1*B1+A2*B2) has the same latency as a conventional fp16 FMA operation of R=C+A*B.

The mixed-precision FMMA (e.g., a combination of fp8 and fp16 or fp8/fp16) data flow may be merged with a conventional fp16 FMA unit by performing the following modification. For an fp16 FMA, the addend is always aligned to the exponent of the first product ("P1") (i.e. an fp16 FMA has only one product, "P1," so the exponent of P1 is used as the "larger" exponent). The mantissa of the fp16 product may be computed in carry-sum form and used in step 3 instead of the two aligned product mantissas. It should be noted that the "mantissa" bits are also interchangeably referred to herein as "fraction" bits.

Thus, the present invention provides for increasing efficiency within a deep learning system by implementing an ultra-low precision floating-point fused multiply-accumulate unit by one or more processors in a computing system, are provided. Mantissas for two products, an exponent difference of the two products serving as an alignment shift amount for a product of the two products having a smallest exponent, and an alignment shift amount for an addend relative to an alternative product of the two product having a larger exponent may be determined in parallel. The addend may be aligned relative to the alternative product having the larger exponent. The product having the smallest exponent may be aligned relative to the alternative product having the larger exponent according to the alignment shift amount.

Thus, the present invention provides for computations used in the training of neural networks, which use a very low precision format, and still converge with a trained network that exhibits an accuracy substantially similar to the accuracy achieved with the presently used single or double precision formats without increasing other computation costs, such as computation time, but preferably improve the time metric as well in cognitive computing.

An embodiment of the present invention can be implemented as a combination of certain hardware components and a software application. An implementation of an embodiment, or one or more components thereof, can be configured as a modified FPU, which is operated using a hardware, software, or firmware operating component. An embodiment can be configured as a modified, with a companion software application executing in some combination of (i) the modified FPU itself, (ii) a data processing system communicating with the modified FPU over a suitable network, or (iii) some combination of (i) and (ii).

In one aspect, the present invention may configure an FPU to operate using a hybrid FMMA unit of non-limiting example 8 bits. A hybrid FMMA unit includes a format configured to represent numbers during a forward pass of a neural network and a second format configured to represent numbers during a backward pass of the neural network. It should be noted, in one aspect, a hybrid FMMA unit may be where R and C are included in the fp16 and A1, A2, B1, and B2 are included in the VLP. However, it should be noted that forward/backward passes are merely one use case to which a hybrid unit may be applied. Hereinafter, any reference to an FPU may be a reference to an FPU that has been configured by an embodiment to use a hybrid format (e.g., fp8/fp16 but hybrid format may also include one of a plurality of VLP formats), unless expressly distinguished where used. In one aspect, an additional hybrid FMMA unit may include a mixed precision with an addend and a result in the fp16 and other inputs in the VLP. Another FMMA unit may be the merged floating point unit and may include an FPU that can implement either an fp16 FMA or equation (2) above with mixed precision.

Figure 2:
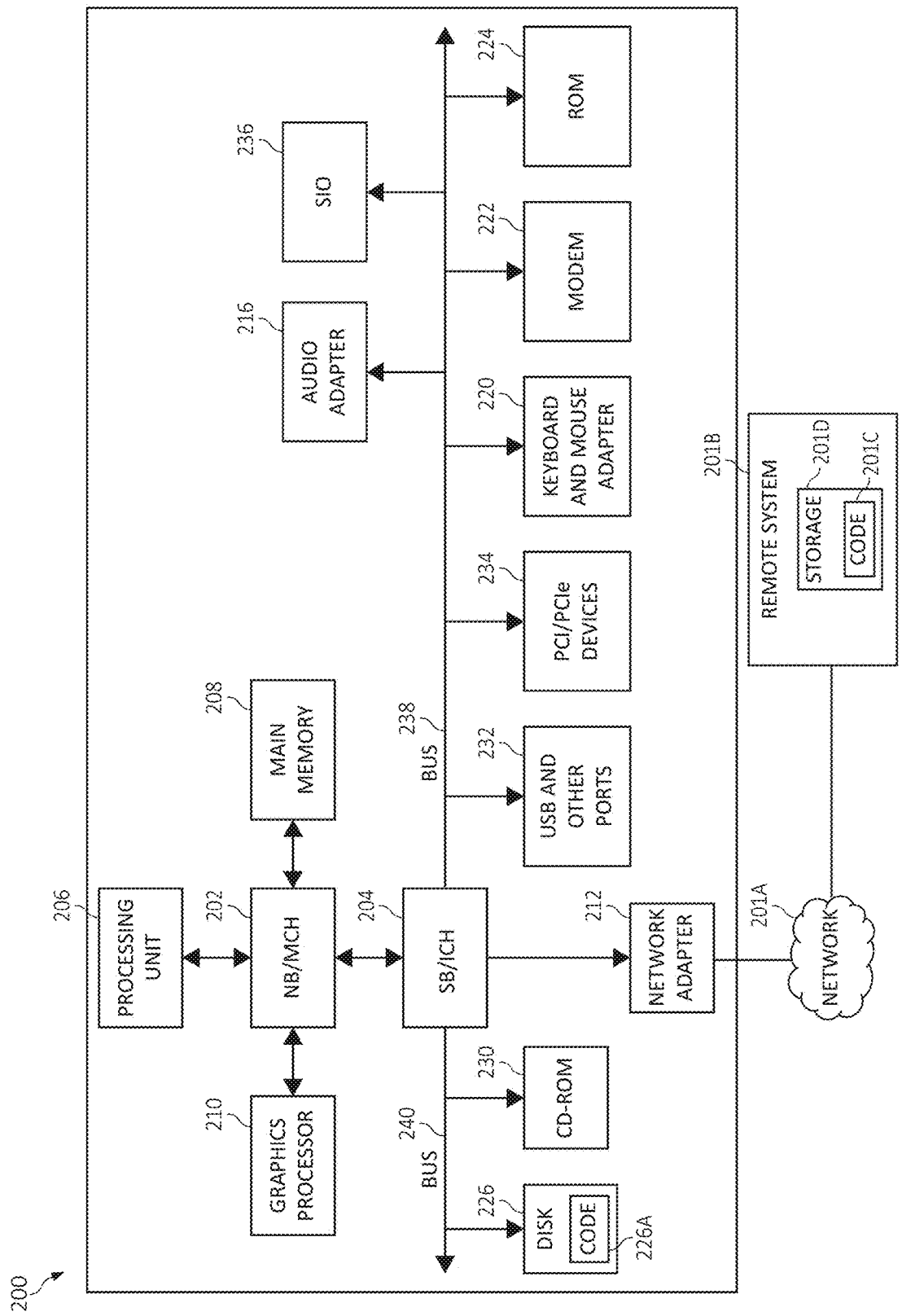
FIG. 2 is a block diagram of a data processing system according to an embodiment of the present invention.

Turning now to FIGS. 1 and 2, are diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Assume that FPU 103 is a modified FPU according to an embodiment and is configured to operate in server 104. For example, server 104 may be participating in training or configuring neural network 107. Application 105 implements an operating component to configure FPU 103, provide program instructions to FPU 103, or otherwise operate FPU 103 for training neural network 107 or for other floating point computations. Application 105 can be implemented in hardware, software, or firmware. Application 105 can be implemented within FPU 103, outside FPU 103 but in server 104, or even outside server 104 in another data processing system across data network 102, e.g., in server 106.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

With reference to FIG. 2, FIG. 2 depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

To further demonstrate how the data flow for ultra-low precision multiply-multiply-accumulate (e.g., the hybrid format fp8/fp16 multiply-multiply-accumulate flow) differs from a floating-point multiply-add (FMA) data flow, consider first the FMA flow of equation (1) (e.g., R=C+A*B), where all operands are floating-point numbers (e.g., in double precision format). The operation can mathematically be expressed as the following equation (e.g., equation (5)):

$$(-1)^{sa*sb}*2^{ea+eb-bias}M_a*M_b+(-1)^{sc}*2^{ec}M_c=(-1)^{sp}*2^{ep}(M_a*M_b+(-1)^{sc*sp}*2^{ec-ep}M_c) \quad (5),$$

where sa, sb, and sc are the sign bits of A, B, and C, respectively; ea, eb, and ec are the exponents of A, B, and C, respectively; expressed as unsigned integers, $M_a$, $M_b$, $M_a*M_c$ are the mantissas of A, B, and C, respectively; sp is a sign of the product of A and B; and ep is ea+eb−bias and bias is an exponent as specified by a floating point format. Also, $(-1)^{sc*sp}$ is +1/−1, indicating an effective add/subtract and the $2^{ec-ep}$ $M_c$ is the aligned addend, and the mantissa M=i.f of a floating-point number is comprised of its fraction "f" and the implied bit "i" derived from the exponent.

The effective operation (addition/subtraction) depends on the sign of the addend and product. The addend may be aligned relative to the product based on the exponent difference. That is, if ec is greater than ep the addend may be shifted left by ec−ep. If ec is less than ep the addend may be shifted right by ep−ec. The absolute value of the exponent difference can be between 0 and 3*emax, where emax is the maximum value of e allowed by the format. For double precision, emax may be equal to 1022 (e.g., emax=1022). There may be an over 3000-bit wide dataflow, which may be unfeasible and the shift is therefore limited. It can be shown that 3*m+5 bits are wide enough, where m is the width of the mantissas of the operands.

Figure 3:
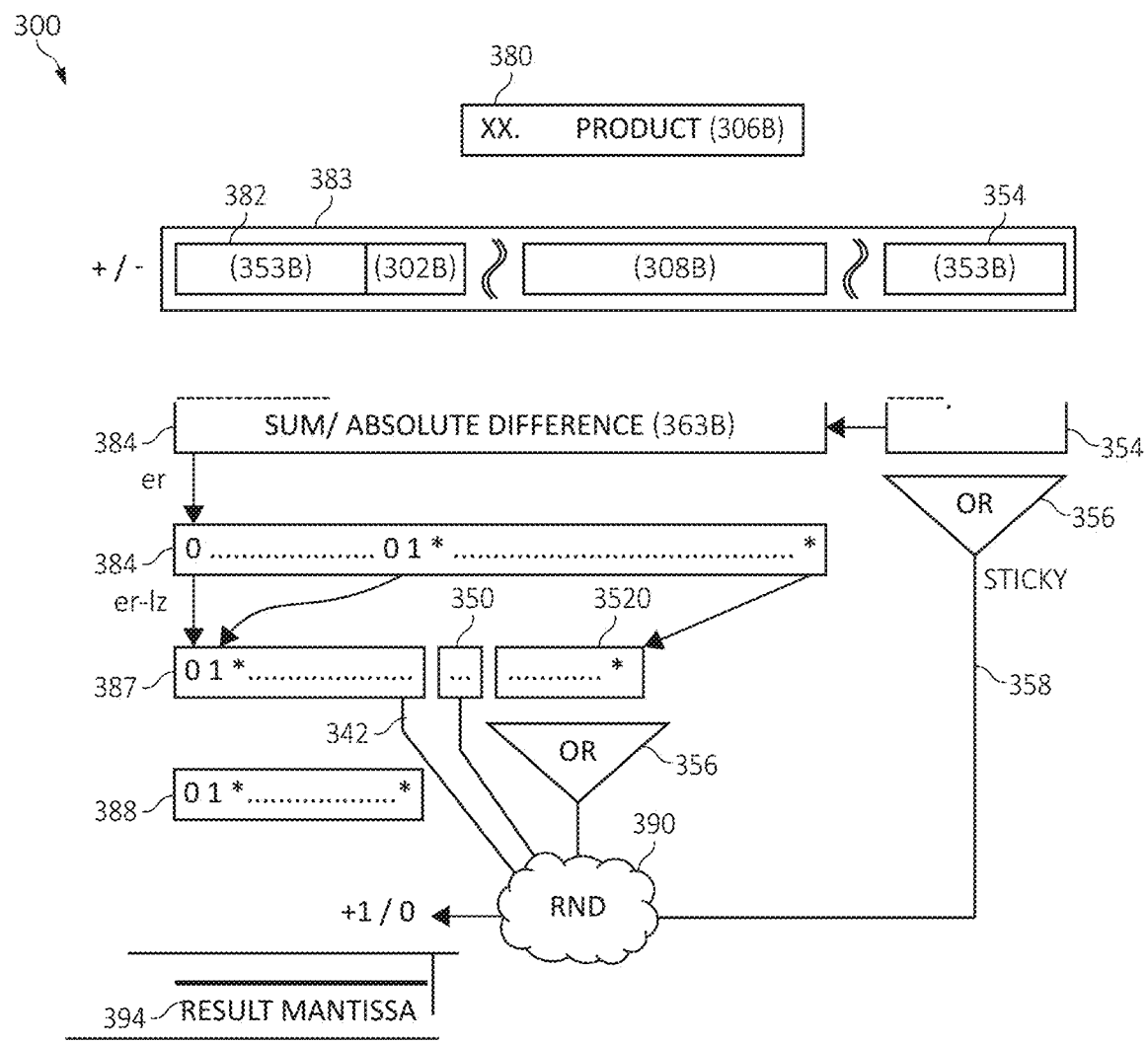
FIG. 3 is a block diagram of a data flow of a modified FMA unit.

To further explain the FMA process, FIG. 3 depicts a concept of an FMA unit 300. FIG. 3 depicts part of a 64b binary floating point unit ("FPU") 300 based on a fused multiply add operation (FMA). The multiplication and alignment stage of the FMA unit 300 is not shown in detail. The binary FPUs are based on an FMA structure to support the IEEE-754-2008 standard in an efficient and high performing manner. The basic operation of an FMA operation using equation (1), R=C+A*B, as described above, where R is the result of the FMA operation, and A, B, C are floating point numbers.

The FMA operation is executed in the following steps, as is schematically illustrated in FIG. 3. After unpacking the operands from the IEEE-754-2008 format into the internal format, the multiplication A*B is performed in order to get a product 320 (106 bit wide) and in parallel aligning of the addend 382 relative to the product 380 in a possible range of 163 bit is performed, with a 53 bit wide field of sticky bits 54. The alignment shift gets saturated. The sticky bit field 354 gets compressed into a single sticky bit 358 by an OR tree 356.

The adder computes a sum or an absolute difference 384 (163 bit wide) of the product 380 and the aligned addend 383, taking the sticky bit into account. The mantissa of the operands and result are in sign-magnitude representation. The exponent of the result is referenced with "er". In parallel to the adder, the number of leading zeros "lz" in the adder result 386 gets anticipated by a leading-zero-anticipator. The normalizer normalizes the mantissa by shifting out the leading zeroes to get the value 387, and adjusts the exponent accordingly by subtracting the number of leading zeroes, in order to result in er-lz. The rounder 390 computes the rounding decision, resulting in a rounding-up signal 389 which indicates whether the fraction is to be incremented by 1 or not, based on the sign, sticky bits 352 and 358, guard bit 350, least significant bit 342, and rounding mode. The rounder 390 also performs the increment of the fraction 388 as needed in order to get the result mantissa 394, performs range checks and applies a post rounding correction if needed. The result 394 is then packed into the IEEE-754-2008 format.

In case of unrounded forwarding, the result 388 gets forwarded to a dependent operation after the normalization but prior to the rounding step. In case that the rounding decision, represented by the rounding-up signal 389, indicates that the rounder 390 is to perform an increment, the forwarded fraction is one unit of least precision ("ulp") too small. Thus, correction terms are used. This is indicated by also forwarding the rounding-up signal 389 to the new operation.

Figure 4:
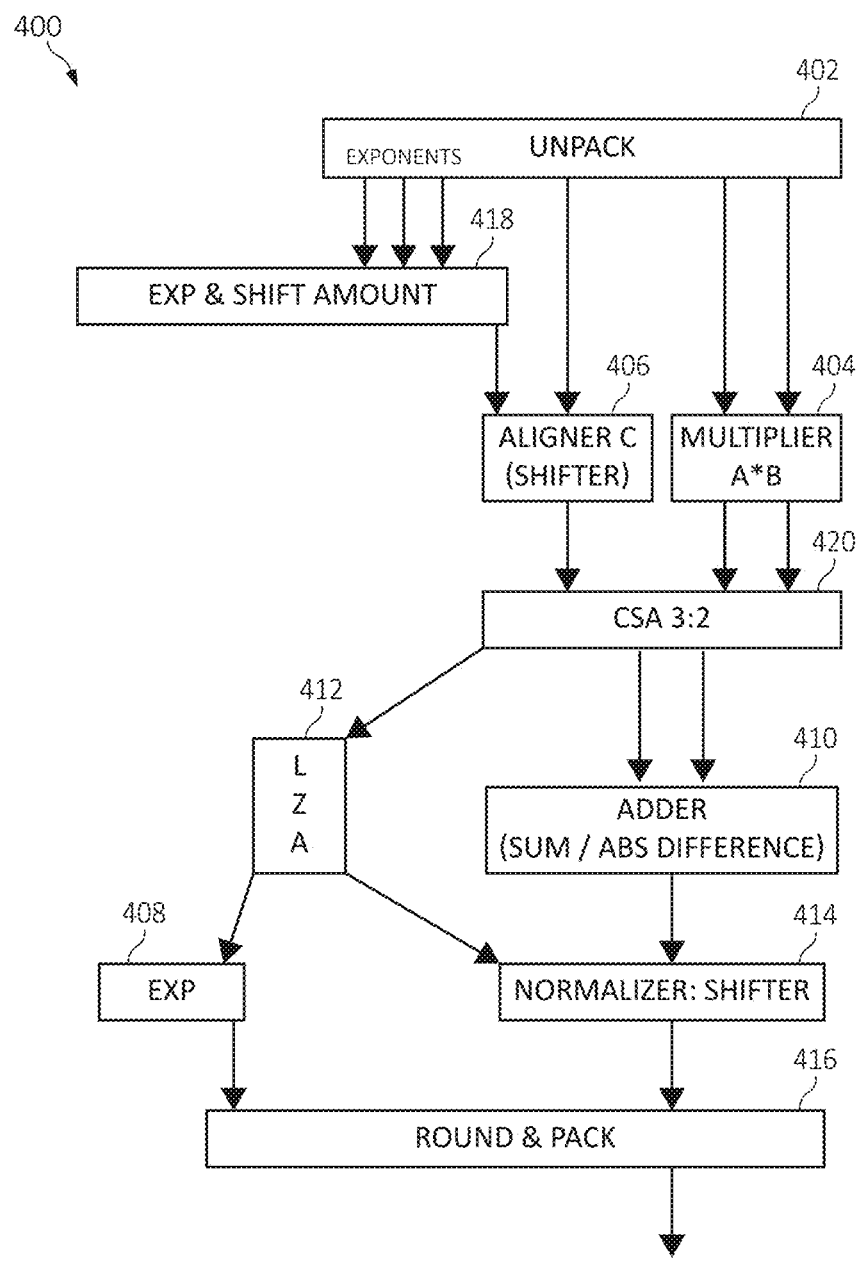
FIG. 4 is an additional block diagram depicting a floating point processor unit.

Such process described in FIG. 3, corresponds to the overall FMA flow may be as follows as illustrated in FIG. 4 depicting an FMA unit 400. The FMA unit 400 may operate according to the fused multiply-add dataflow ("R=C+A*B" of equation 1), where "A" is the multiplicand, "B" is the multiplier, "C" is the addend, and "R" is the result. The FMA 400 format may be a fp16.

The dataflow of FMA 400 illustrated in FIG. 4 includes a block 402 to format and unpack the operand into its sign, exponent and significand components. The dataflow also includes a multiplier 404, a block 406 (e.g., aligner C ("shifter")) to properly align the addend to the product of the multiplier before the addend can be added or combined with the product, and an exponent dataflow block 408. The FMA dataflow further includes an adder 410 (e.g., a 3:2 carry sum adder (CSA)), a leading zero anticipator ("LZA") 412, a normalizer 414 (e.g., shifter), a rounder 416, and a packer 418 along with its corresponding result multiplexer that converts the rounded result back into the instruction specific format.

As previously mentioned, the mixed-precision fp8 (e.g., a combination of fp8 and fp16 or fp8/fp16) FMMA operation is an ultra-low precision multiply-multiply-accumulate. That is, for 16-bit inputs and result, the basic floating point function for the hybrid fp8 format users equation 2 (e.g., R=C+A1*B1+A2*B2) where R and C are in fp16, and the product terms A1, A2, B1, B2 are in fp8, where the format described may be a 6-bit exponent and 9-bit fraction), and where the product terms A1, B1, A2, B2 are all in fp8 format with 5-bit exponent and 2-bit fraction.

However, it should be noted that there are two differences between the high precision FMA using equation 1 (e.g., ("R=C+A*B) and the ultra-low precision multiply-multiply-accumulate FMMA using equation 2 (e.g., R=C+A1*B1+A2*B2). First, the ultra-low precision multiply-accumulate FMMA has three terms to be aligned; two products and an addend, whereas the FMA has only two terms. Second, computing an fp16 (or higher-precision) product (even in carry-sum form) takes as long as aligning the addend. In contrast, for VLP inputs with just 3-bit mantissas, computing the 6-bit products is extremely fast and is even faster than computing the aligner shift amount.

Thus, the ultra-low precision FMMA unit aligns the addend and the two products relative to the product with the larger exponent. The ultra-low precision FMMA uses the following general execution scheme by determining, in parallel a) the product mantissas (e.g., pm1 and pm2) for the two products, b) the exponent difference of the two products, which serves as alignment shift amount for the product with the smaller exponent, and c) alignment shift amount for addend relative to product with larger exponent. The addend may be aligned relative to the product with larger exponent.

The product with a smaller exponent relative to the product one with larger exponent may also be aligned. Depending on the sign of the addend and products, add or subtract the aligned mantissas (e.g., fractions). The corresponding exponent is emax. The intermediate sum/difference may be normalized and rounded to a target precision. Such operations correspond to the alignment scheme of FIG. 5.

Figure 5:
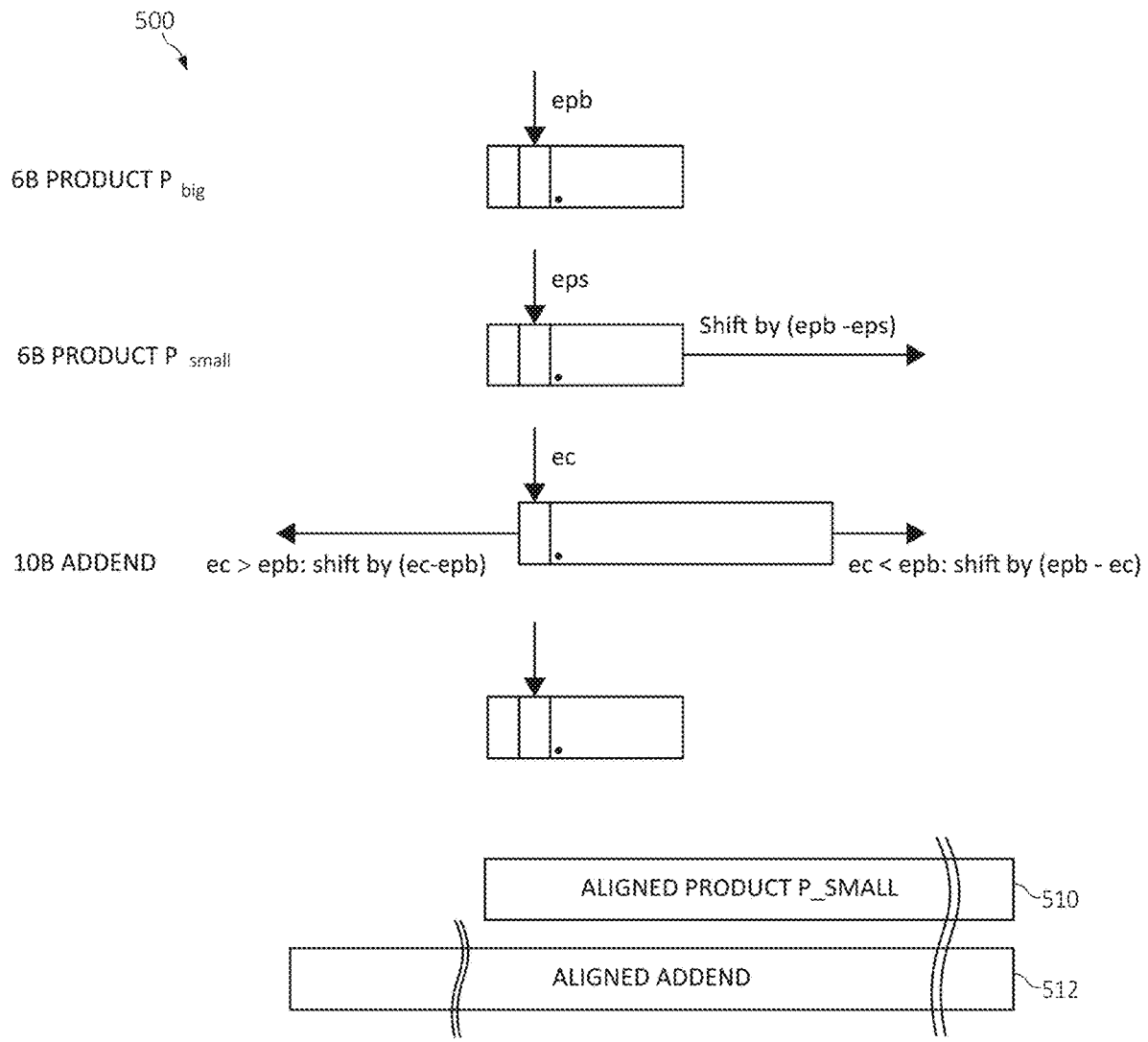
FIG. 5 is an additional block diagram depicting an alignment configuration for implementing a modified floating-point fused multiply-multiply-accumulate unit according to an embodiment of the present invention.

FIG. 5 is block diagram 500 depicting an alignment configuration for implementing a hybrid floating-point fused multiply-accumulate unit using a 1-6-2 bit format (e.g., a 6-bit exponent and 2-bit fraction format) for A1, B1, A2 and B2. With this format, the products A1*B1 and A2*B2 are 6-bit values. FIG. 5 depicts 6-bit wide products such as, for example, 6-bit product $p_{big}$ ("$ep_{big}$", "epb" or "$ep_b$") and 6-bit product $p_{small}$. In the example of FIG. 5, a 6-bit wide product $P_{big}$ is determined to be the product with the largest exponent as compared to the other product such as, for example, 6-bit product wide $P_{small}$ ("$ep_{small}$", "eps" or "$ep_s$")). As depicted, $ep_{small}$ is shifted by $ep_{big}$ minus $ep_{small}$ (e.g., $ep_{big}-ep_{small}$). In this way, $ep_{small}$ is normalized to "$ep_{big}$".

For the addend exponent (e.g., "ec"), if ec is greater than "$ep_{big}$", the addend may be shifted left by ec−epb. If ec is less than epb, the addend may be shifted right by epb−ec. Thus, the addend may be shifted to the left or to the right. A selected number of bits may be retained while discarding a number of bits of the product for aligning the product having the smallest exponent relative to the alternative product having the larger exponent. A selected number of bits may be retained while discarding an alternative number of bits of the addend for aligning the addend relative to the alternative product having the larger exponent.

Figure 6A:
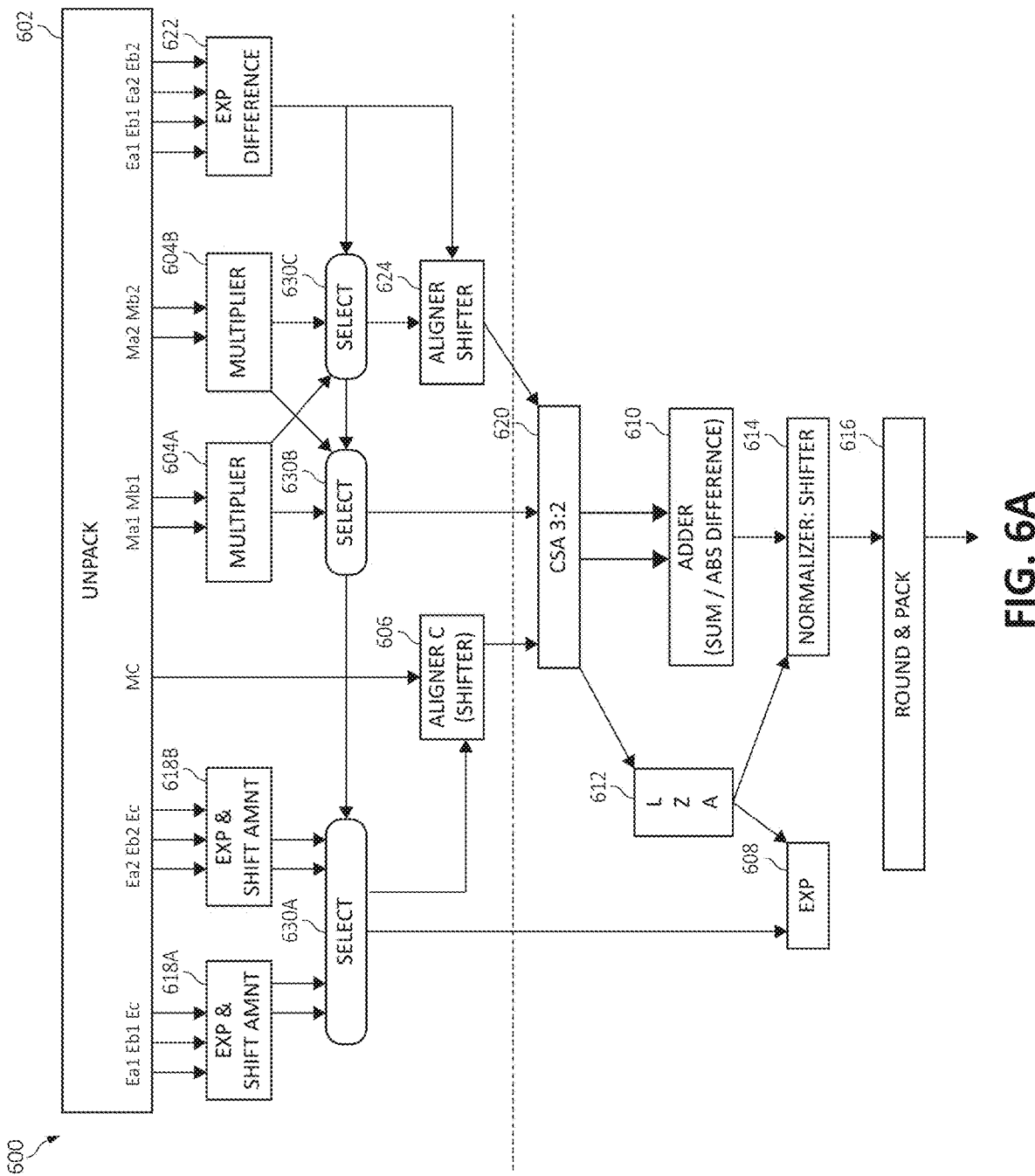
FIG. 6A is a block diagram a data flow of ultra-low precision multiply unit according to an embodiment of the present invention.
Figure 6B:
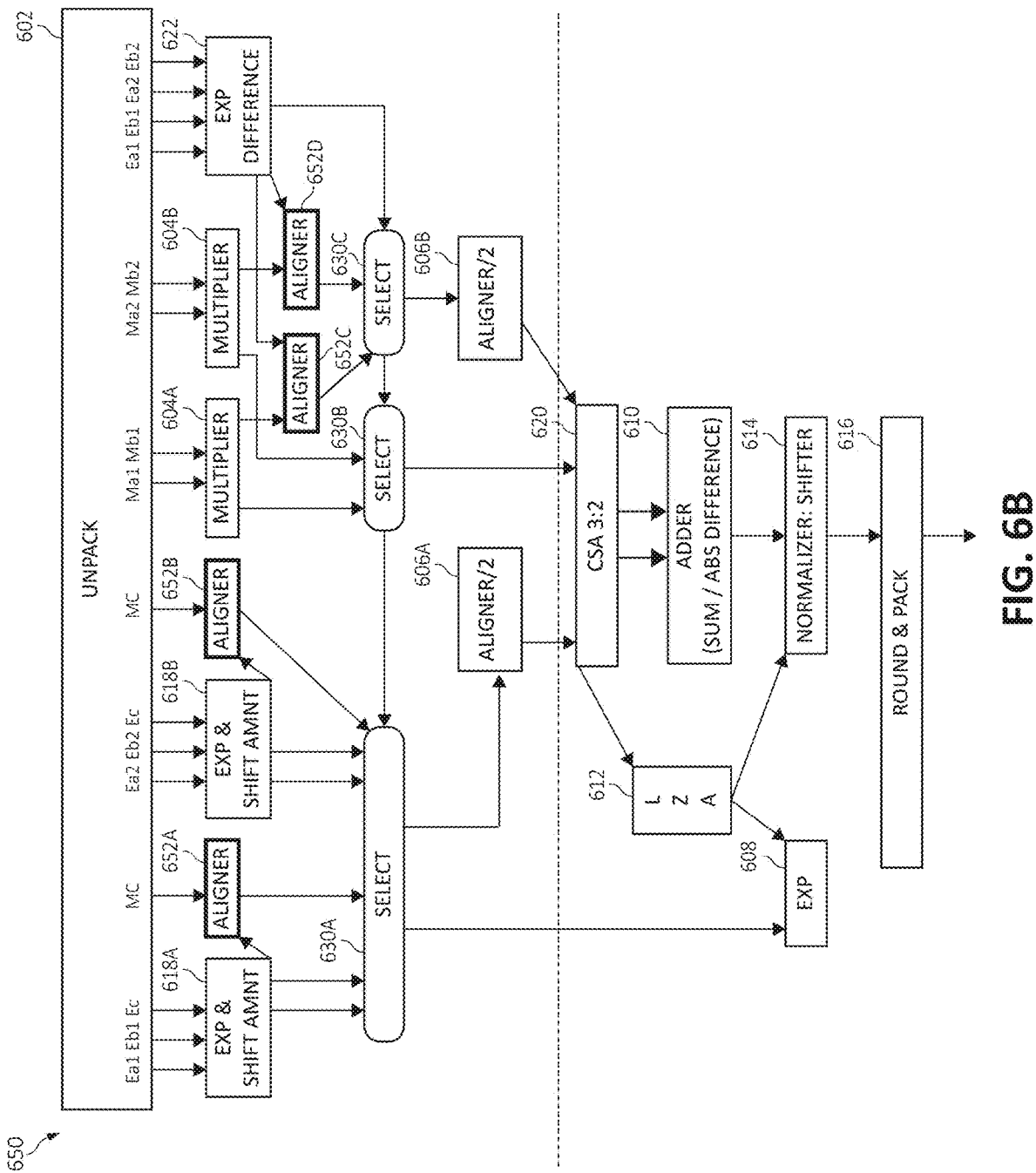
FIG. 6B is a block diagram a data flow of ultra-low precision multiply unit for timing optimization according to an embodiment of the present invention.
Figure 6C:
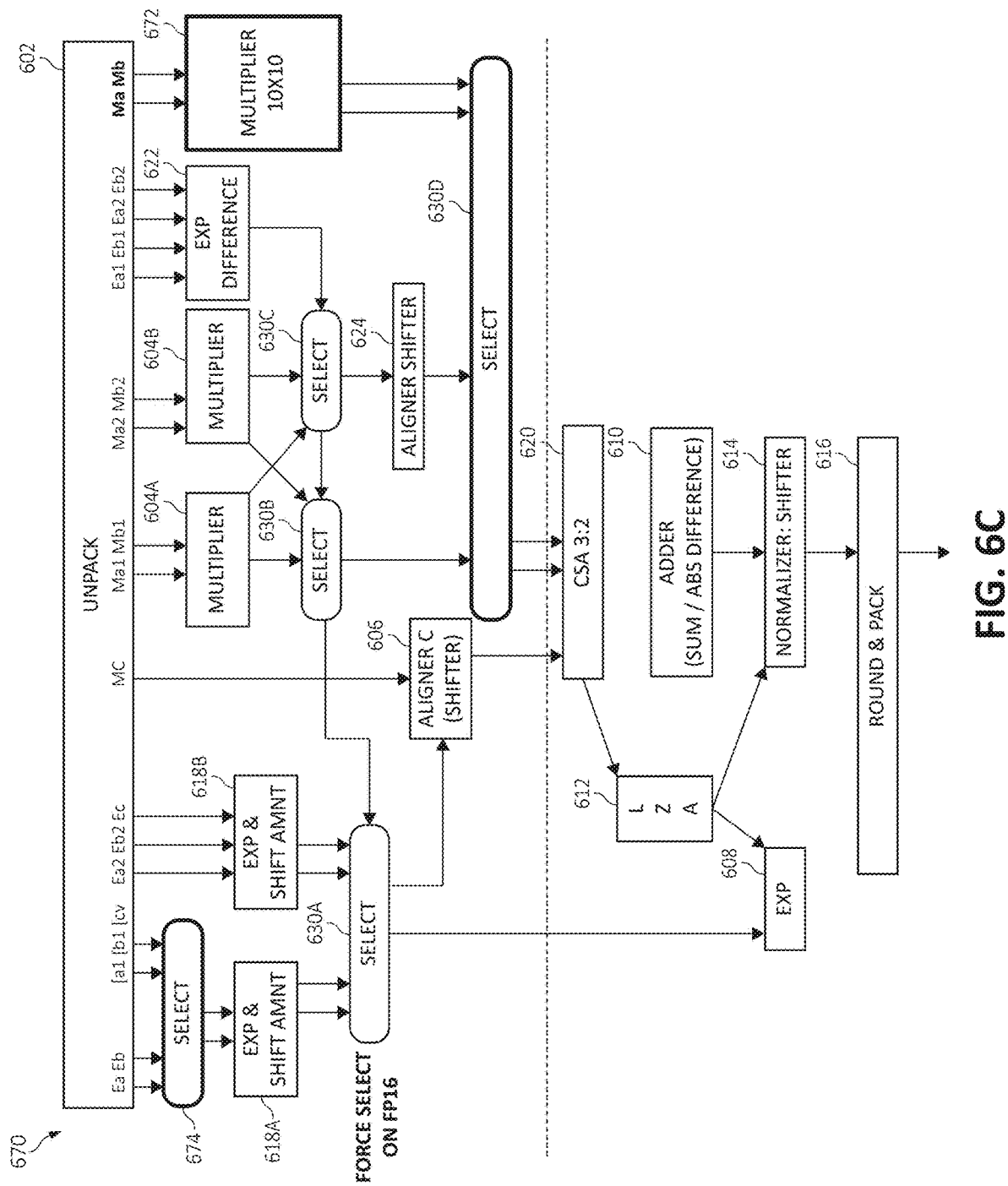
FIG. 6C is a block diagram a data flow of ultra-low precision multiply unit combining a half-precision floating point ("FP16") and low-precision floating point ("FP8") according to an embodiment of the present invention.

To further illustrate, consider the various configurations and implementations of the mixed-precision FMMA unit (e.g., the hybrid fp8 format that is a combination of fp8 and fp16 "fp8/fp16") depicted in FIGS. 6A-6C to simplify the DL training using the hybrid fp8 format FMMA operation (e.g., equation 2). It should be noted that FIG. 6A-6B depicts a mixed-precision FMMA unit and/or a hybrid-precision FMMA, but is illustrated and referred to in FIGS. 6A and 6B as mixed-precision FPU 600 for illustration purposes only. FIG. 6B illustrates a faster way to achieve the same results as FIG. 6A. For example, the mixed-precision FMMA unit 600 in FIG. 6A uses the exponent difference to select one product in 630C and then aligns it. In FIG. 6B, both products get shifted by a partial shift amount while before one is selected. FIG. 6C is the merged FPU, which can do a VLP FMMA or a fp16 FMA. FIG. 6A and FIG. 6B may also be hybrid-precision FMMAs if the unpack block has configuration inputs which tell it which format is used for each input.

As a preliminary matter, the (ultra-low precision) mixed-precision FMMA unit 600 (or may be a hybrid-precision FMMA unit) of FIGS. 6A-6C may operate according to the fused multiply-add dataflow of equation 2 (e.g., R=C+A1*B1+A2*B2) where R and C are in fp16, and the product terms A1, A2, B1, B2 are in fp8.

Turning now to FIG. 6A, block diagram depicts the data flow of the mixed-precision FMMA unit 600 (using equation 2). It should be noted that those portions of the mixed-precision FMMA unit 600 below the "dashed line" depict those components of the half-precision FMA unit (e.g., fp16 format or fp16 engine). Those portions of the mixed-precision FMMA unit 600 above the "dashed line interface" depict those components of the mixed-precision FMMA unit (e.g., fp8 format or fp8 engine).

The dataflow of mixed-precision FMMA unit 600 (which are also illustrated in FIGS. 6B-6C) may include a block 602 to format and unpack the operand into its sign, exponent and significand components. The dataflow also include one or more multipliers 604 (e.g., multipliers 604A and 604B), block 606 (e.g., aligner C ("shifter")) to properly align the addend to the product of the multiplier before the addend can be added or combined with the product, and an exponent dataflow block 608. The FMA dataflow further includes an adder 610 (e.g., a 3:2 carry sum adder (CSA)), a leading zero anticipator ("LZA") 612, a normalizer 614 (e.g., shifter), blocks 618A and 618B for exponent and shift amounts, an exponential difference block 622, an align shifter 624, and one or more select blocks 630A-630C, and/or a rounder and packer 618 along with its corresponding result multiplexer that converts the rounded result back into the instruction specific format.

As illustrated, in FIG. 6A, rather than having two exponents there are four exponents such as, for example, $Ea_1$, $Ea_2$, $Eb_1$, and $Eb_2$. A computation operation is performed to determine an exponent difference via the exponent difference block 622 such as, for example by $(Ea_1+Eb_1)-(Ea_2+Eb_2)$. The output of block 622 is the difference between the exponents of product 1 (e.g., product mantissa 1 "EP1" from block 604A) and product 2 (e.g., product mantissa 2 "EP2" from block 604B). Which of the two product mantissas PM1 and PM2 has the larger exponent is indicated by the sign bit of the difference. Using this sign bit, block 630C selects the product with the smaller exponent (e.g., the $ep_{small}$ of FIG. 5) which is the input of the align shifter 624.

In a parallel operation, EP1—Ec and EP2—Ec may be determined by blocks 618A and 618B, and selected by the same sign bit from block 622, one is chosen as the shift amount for the addend (i.e., the shift amount for block 606). By the time the select signal is achieved (e.g., a determination as to which of the two products EP1 or EP2 is larger), both products from 604A and 604B are available to be selected by blocks 630B and 630C. Blocks 618A and 618B also each provide a possible value of the result exponent. Again, which of the possible exponent is provided to the exponent dataflow block 608 is determined, through the select block 630A, by which product has the larger exponent (the select signal from block 622).

The alignment shift amount chosen by select block 630A may be used to align the mantissa of the addend (e.g., "MC") using the aligner C (shifter) 606. Thus, at the "dashed line" separating the fp8 format from the fp16 format, there are three terms; 1) the $mp_{big}$ (e.g., product mantissa having the largest exponent), 2) the aligned $mp_{small}$ and the aligned addend (e.g., "MC"). Thus, those components forming the fp16 FMA engine below the "dashed line interface" may execute as previously described in FIG. 4.

Turning now to FIG. 6B, block diagram 650 illustrates a possible embodiment of the mixed-precision FMMA unit 600 (or may be a hybrid-precision FMMA unit) for timing optimization. The one or more multipliers 604 (e.g., multipliers 604A for $Ma_1*Mb_1$ and 604B for $Ma_2*Mb_2$) are 3×3 bit multipliers and are extremely fast. The timing critical part of mixed-precision FMMA unit 600 is therefore the computation of the select signal based on the exponent difference of the two product exponents. Thus, the aligners 652A-D provides for aligning the addend relative to the alternative product having the larger exponent and aligning the product having the smallest exponent relative to the alternative product having the larger exponent according to the alignment shift amount.

It should be noted that the mantissas for two products (e.g., product P1 and product P2) may be pre-shifted prior to aligning the addend (e.g., "MC") and the product relative to the alternative product having the larger exponent (e.g., product $p_{big}$). The selection blocks 630A-C may select between one of the pre-aligned mantissas for aligning the addend (e.g., "MC") and the product having the smallest exponent (e.g., $p_{small}$).

The alignment shifts for addend and product are usually done with a barrel shifter, which starts with short shifts and then does the wider shifts. For balancing the timing, the short shifts can be moved before the select, doing the short shifts twice, relative to product EP1 and EP2. Once the select signal is ready, then a selector such as, selector 630B or 630C may select between the pre-shifted mantissas (e.g., product EP1 and EP2).

Turning now to FIG. 6C is a block diagram that depicts data flow of ultra-low merged FPU unit 670 by combining a half-precision floating point ("FP16") and low-precision floating point ("FP8"), which is the merged FPU unit 670. It should be noted the present invention provides for a merged FPU fp8/fp16 FPU (as shown in FIG. 6C) and also provides a hybrid FMMA (FP8 format) (1/5/2 and 1/6/1).

In one aspect, the merged FPU unit 670 (e.g., fp8/fp16) and the fp16 FMA scheme may be similar; the adder 610, normalizer 614, and round and pack 616 stage are even the same. Thus, the two data flows such as, for example, the ultra-low precision FMA ("fp8) and half-precision FMA ("fp16) can be combined, resulting in a unit which can either perform an fp16 FMA (e.g., using equation 1) or an fp8/fp16 multiply-accumulate (e.g., using equation 2). A merged FPU unit 670 requires only a few changes illustrated as follows. 1) An fp16 multiplier may be used. For, the merged FPU, the fp16 bit format with 6-bit exponent and 9-bit fraction, that would be a 10-bit×10-bit multiplier 672 (e.g., a booth multiplier), which produces a product in redundant format as sum and carry vector. 2) The shift amount calculation for the addend (e.g., aligner C 606) and the exponent calculation are based on the exponent of the P1 product (e.g., $ep_{big}$ or EP1).

Additionally, to further explain the operation of the hybrid FMMA (e.g., FP8 FMMA), consider again the floating point function of equation 2 (e.g., R=C+A1*B1+A2*B2) where R, C are in fp16, and the product terms A1, A2, B1, B2 are in fp8 (e.g., the 16-bit input for A and B is as a two-element pair, with 8 bits per element).

In the hybrid FMMA unit (e.g., the ultra-low precision hybrid FMMA unit 600), A1, A2, B1, and B2 may be allowed to be in either 1,5,2 format (e.g., 5 exponent bits, 2 mantissa bits) or 1,6,1 format (e.g., 6 exponent bits, 1 mantissa bit). A1 and A2 may be constrained to be in the same format, and so are B1 and B2. That is, the present invention configures the hybrid FP8 FMMA to use a first non-limiting example 8-bit very low precision format. The embodiment apportions the 8-bit format as (sign, exponent, fraction) as equal to (1,5,2). An embodiment configures an FPU to use a second non-limiting example 8-bit very low precision format. The embodiment apportions the 8-bit format as (sign, exponent, fraction) as equal to (1,6,1).

This allows 4 different modes/scenarios using equation (2) (e.g., R=C+A1*B1+A2*B2) that the hybrid FMMA configuration supports:

(a) A1, A2, B1 and B2 are all in 1,5,2 format;
(b) A1, A2, B1 and B2 are all in 1,6,1 format;
(c) A1 and A2 are 1,5,2 format, while B1 and B2 are in 1,6,1 format; and
(d) A1 and A2 are 1,6,1 format, while B1 and B2 are in 1,5,2 format.

The hybrid FMMA configuration enabling these modes/scenarios in hardware require only two additional logic element. Both of the two additional logic elements are in the "unpack" block in FIG. 6C. It should be noted that a hybrid FP8 operation may be supported in each of the configurations illustrated in FIGS. 6A-6C.

First, the "unpack" block 602 includes logic to rebias the exponents of the 8b-inputs and 16b-inputs. To allow for both 5b exponents and 6b exponents for the 8b-inputs, the rebiasing logic supports two different modes. Since the biases in the two modes differ by a power of 2, the additional overhead of this logic is minimal.

Second, the "unpack" block 602 also prepares the inputs to the multipliers as follows (where s is the sign and e("_") is the bit number of the exponent:

1) The bits in the 1,5,2 the format are: s m(1) e(4) e(3) e(2) e(1) e(0) m(0); and
2) The bits in the 1,6,1 format are: s e(5) e(4) e(3) e(2) e(1) e(0) m(0).

In conventional FMA the 1,5,2 format, the input to the multiplier is: 1 m(0) m(1). In conventional FMA the 1,6,1 format, the input to the multiplier is: 1 m(0) 0. Thus the only additional logic required for supporting 2 formats is an extra AND gate for the LSB of the input to the multiplier. Thus, the present invention overhead of hybrid FP8 FMMA operation compared to regular FP8 FMMA operation is minimal.

Figure 7:
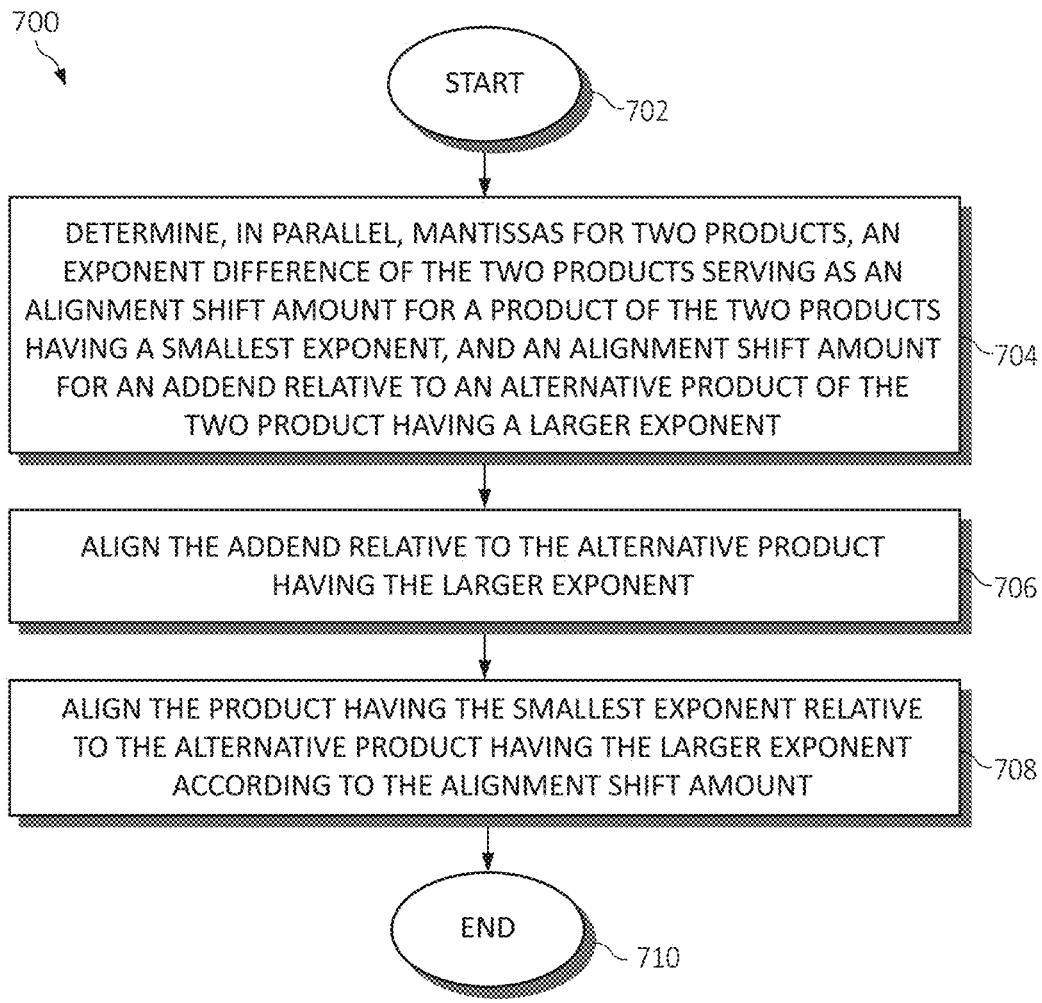
FIG. 7 is a flowchart diagram depicting an exemplary method for implementing an fused multiply-multiply-accumulate ("FNMA") unit in a computing environment according to an embodiment of the present invention by a processor, in which aspects of the present invention may be realized.

Turning now to FIG. 7, a method 700 for implementing a fused multiply-multiply-accumulate ("FMMA") unit in a computing environment by a processor is depicted, in which various aspects of the illustrated embodiments may be implemented. That is, FIG. 7 is a flowchart of an additional example method 700 for implementing a modified floating-point fused multiply-accumulate unit in a computing environment according to an example of the present technology. The functionality 700 may be implemented as a method executed as instructions on a machine, where the instructions are included on at least one computer readable medium or one non-transitory machine-readable storage medium. The functionality 700 may start in block 702.

Mantissas for two products, an exponent difference of the two products serving as an alignment shift amount for a product of the two products having a smallest exponent, and an alignment shift amount for an addend relative to an alternative product of the two product having a larger exponent may be determined in parallel, as in block 704. The addend may be aligned relative to the alternative product having the larger exponent, as in block 706. The product having the smallest exponent may be aligned relative to the alternative product having the larger exponent according to the alignment shift amount, as in block 708. The functionality 700 may end, as in block 710.

In one aspect, in conjunction with and/or as part of at least one block of FIG. 7, the operations of 700 may include each of the following. The operations of 700 may add or subtract the mantissas for each of the two products according to a sign of the addend and the two products. The operations of 700 may retain a selected number of bits while discarding an alternative number of bits of the product for aligning the product having the smallest exponent relative to the alternative product having the larger exponent, and/or retain a selected number of bits while discarding an alternative number of bits of the addend for aligning the addend relative to the alternative product having the larger exponent.

The operations of 700 may normalize and round an intermediate summation or difference of aligned mantissas for each of the two products to a targeted precision. The operations of 700 may pre-shift the mantissas for two products prior to aligning the addend and the product relative to the alternative product having the larger exponent, and/or select between one of the pre-aligned mantissas for aligning the addend and the product relative to the alternative product having the larger exponent. The operations of 700 may perform a mixed-precision FMMA operation by using one or more inputs, one or more outputs, or a combination thereof in a selected format, perform a hybrid-fused FMMA operation by enabling a very low precision format (VLP) operand to use a plurality of formats, or performing a merged FMMA operation by performing the mixed-precision FMMA operation and a half-precision fused multiple accumulate ("FMA") operation. The modified floating-point fused multiply-accumulate unit uses a half-precision fused multiple accumulate ("FMA") operation with a very low precision format (VLP) FMA. The VLP FMA is a format using less than sixteen bits. The FMMA unit may implement both a half-precision fused multiple add ("FMA") operation and a very low precision format (VLP) fused multiple-multiply accumulate ("FMMA") operation, wherein the VLP is a format using less than sixteen bits comprising a sign bit, exponent bits (e), and mantissa bits (m), and the FMMA unit is selectively configured to perform the FMA operation or the FMMA operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for implementing a fused multiply-multiply-accumulate (FMMA) operation in a computing environment, comprising:
  receiving, by the one or more processors, an instruction stored in a memory, wherein the instruction contains at least two operands of mixed bit-precision formats; and
  executing the instruction, wherein, when executing the instruction, the one or more processors implement a FMMA unit to perform an internal rounding operation associated with floating point arithmetic of the instruction by performing each of:
    determining by multiplier circuitry within the FMMA unit, in parallel, mantissas for two products, an exponent difference of the two products serving as an alignment shift amount for a product of the two products having a smallest exponent, and an alignment shift amount for an addend relative to an alternative product of the two products having a larger exponent, wherein the mantissas are pre-shifted prior to aligning the addend and the product relative to the alternative product, and wherein the addend and the product having the smallest exponent are aligned prior to receiving a select signal indicating to a selector to select between one of the pre-shifted mantissas when performing the alignment of the addend and the product relative to the alternative product;
    aligning, by aligning circuitry within the FMMA unit, the addend relative to the alternative product having the larger exponent; and
    aligning, by the aligning circuitry, the product having the smallest exponent relative to the alternative product having the larger exponent according to the alignment shift amount for the product of the two products having the smallest exponent.

2. The method of claim 1, further including adding or subtracting the mantissas of the two products according to a sign of the addend and the two products.

3. The method of claim 1, further including retaining a selected number of bits while discarding an alternative number of bits of the product for aligning the product having the smallest exponent relative to the alternative product having the larger exponent.

4. The method of claim 1, further including retaining a selected number of bits while discarding an alternative number of bits of the addend for aligning the addend relative to the alternative product having the larger exponent.

5. The method of claim 1, further including normalizing and rounding an intermediate summation or difference of aligned mantissas for each of the two products and the aligned addend to a targeted precision.

6. The method of claim 1, further including:
  performing a mixed-precision FMMA operation by using one or more inputs, one or more outputs, or a combination thereof in a selected format; or
  performing a hybrid-fused FMMA operation by enabling a very low precision format (VLP) operand to use a plurality of formats.

7. The method of claim 1, wherein the FMMA unit implements both a half-precision fused multiple add (FMA) operation and a very low precision format (VLP) FMMA operation, wherein the VLP is a format using less than sixteen bits comprising a sign bit, exponent bits (e), and mantissa bits (m), and the FMMA unit is selectively configured to perform the FMA operation or the FMMA operation.

8. A system for implementing a fused multiply-multiply-accumulate (FMMA) operation in a computing environment, comprising:
  one or more hardware memory storing executable instructions;
  one or more hardware processors; and
  a FMMA unit implemented within the one or more hardware processors, wherein the one or more hardware processors are configured to:
    receive, by the one or more hardware processors, one of the executable instructions stored in the one or more memory, wherein the instruction contains at least two operands of mixed bit-precision formats; and
    execute the one of the executable instructions by implementing the FMMA unit to perform an internal rounding operation associated with floating point arithmetic performing each of:
      determining by multiplier circuitry within the FMMA unit, in parallel, mantissas for two products, an exponent difference of the two products serving as an alignment shift amount for a product of the two products having a smallest exponent, and an alignment shift amount for an addend relative to an alternative product of the two products having a larger exponent, wherein the mantissas are pre-shifted prior to aligning the addend and the product relative to the alternative product, and wherein the addend and the product having the smallest exponent are aligned prior to receiving a select signal indicating to a selector to select between one of the pre-shifted mantissas when performing the alignment of the addend and the product relative to the alternative product;
      aligning, by aligning circuitry within the FMMA unit, the addend relative to the alternative product having the larger exponent; and
      aligning, by the aligning circuitry, the product having the smallest exponent relative to the alternative product having the larger exponent according to the alignment shift amount for the product of the two products having the smallest exponent.

9. The system of claim 8, wherein the executable instructions further add or subtract the mantissas of the two products according to a sign of the addend and the two products.

10. The system of claim 8, wherein the executable instructions further retain a selected number of bits while discarding an alternative number of bits of the product for aligning the product having the smallest exponent relative to the alternative product having the larger exponent.

11. The system of claim 8, wherein the executable instructions further retain a selected number of bits while discarding an alternative number of bits of the addend for aligning the addend relative to the alternative product having the larger exponent.

12. The system of claim 8, wherein the executable instructions further normalize and round an intermediate summation or difference of aligned mantissas for each of the two products and the aligned addend to a targeted precision.

13. The system of claim 8, wherein the executable instructions further:
    perform a mixed-precision FMMA operation by using one or more inputs, one or more outputs, or a combination thereof in a selected format; or
    perform a hybrid-fused FMMA operation by enabling a very low precision format (VLP) operand to use a plurality of formats.

14. The system of claim 8, wherein the FMMA unit implements both a half-precision fused multiple add (FMA) operation and a very low precision format (VLP) FMMA operation, wherein the VLP is a format using less than sixteen bits comprising a sign bit, exponent bits (e), and mantissa bits (m), and the FMMA unit is selectively configured to perform the FMA operation or the FMMA operation.

15. A computer program product for, by a processor, implementing a fused multiply-multiply-accumulate (FMMA) operation in a computing environment, the computer program product comprising a non-transitory computer-readable storage medium having computer-readable program code portions stored therein, the computer-readable program code portions comprising:
    an executable portion that receives, by the processor, an instruction stored in a memory, wherein the instruction contains at least two operands of mixed bit-precision formats; and
    an executable portion that executes the instruction, wherein, when executing the instruction, the one or more processors implement a FMMA unit to perform an internal rounding operation associated with floating point arithmetic of the instruction by performing each of:
        determining, in parallel, mantissas for two products, an exponent difference of the two products serving as an alignment shift amount for a product of the two products having a smallest exponent, and an alignment shift amount for an addend relative to an alternative product of the two products having a larger exponent, wherein the mantissas are pre-shifted prior to aligning the addend and the product relative to the alternative product, and wherein the addend and the product having the smallest exponent are aligned prior to receiving a select signal indicating to a selector to select between one of the pre-shifted mantissas when performing the alignment of the addend and the product relative to the alternative product;
        aligning, by aligning circuitry within the FMMA unit, the addend relative to the alternative product having the larger exponent; and
        aligning, by the aligning circuitry, the product having the smallest exponent relative to the alternative product having the larger exponent according to the alignment shift amount for the product of the two products having the smallest exponent.

16. The computer program product of claim 15, further including an executable portion that adds or subtracts the mantissas of the two products according to a sign of the addend and the two products.

17. The computer program product of claim 15, further including an executable portion that:
    retains a selected number of bits while discarding an alternative number of bits of the product for aligning the product having the smallest exponent relative to the alternative product having the larger exponent; and
    retains a selected number of bits while discarding an alternative number of bits of the addend for aligning the addend relative to the alternative product having the larger exponent.

18. The computer program product of claim 15, further including an executable portion that normalizes and rounds an intermediate summation or difference of aligned mantissas for each of the two products and the aligned addend to a targeted precision.

19. The computer program product of claim 15, further including an executable portion that:
    performs a mixed-precision FMMA operation by using one or more inputs, one or more outputs, or a combination thereof in a selected format; or
    performs a hybrid-fused FMMA operation by enabling a very low precision format (VLP) operand to use a plurality of formats.

20. The computer program product of claim 15, wherein the FMMA unit implements both a half-precision fused multiple add (FMA) operation and a very low precision format (VLP) FMMA operation, wherein the VLP is a format using less than sixteen bits comprising a sign bit, exponent bits (e), and mantissa bits (m), and the FMMA unit is selectively configured to perform the FMA operation or the FMMA operation.

* * * * *